(12) United States Patent
Maxwell, Jr.

(10) Patent No.: US 11,679,723 B1
(45) Date of Patent: Jun. 20, 2023

(54) LADDER TRANSPORT SYSTEMS

(71) Applicant: Robert H. Maxwell, Jr., Quincy, FL (US)

(72) Inventor: Robert H. Maxwell, Jr., Quincy, FL (US)

(*) Notice: Subject to any disclaimer, the term of this patent is extended or adjusted under 35 U.S.C. 154(b) by 992 days.

(21) Appl. No.: 16/529,876

(22) Filed: Aug. 2, 2019

(51) Int. Cl.
*B60R 9/00* (2006.01)
*E06C 5/00* (2006.01)

(52) U.S. Cl.
CPC ... *B60R 9/00* (2013.01); *E06C 5/00* (2013.01)

(58) Field of Classification Search
CPC .............. B60R 9/00; E06C 5/00; B60R 9/0423
USPC .................... 182/127; 224/403, 405
See application file for complete search history.

(56) References Cited

U.S. PATENT DOCUMENTS

| | | | | |
|---|---|---|---|---|
| 3,319,811 A * | 5/1967 | Martin, Jr et al. | ...... | B60P 1/435 414/537 |
| 3,472,546 A * | 10/1969 | Samuels et al. | ....... | B60R 13/04 52/716.5 |
| 4,090,587 A * | 5/1978 | Pyle | ......................... | E06C 1/34 182/206 |
| 5,560,666 A * | 10/1996 | Vieira et al. | ............. | B60P 3/40 410/116 |
| 5,649,682 A * | 7/1997 | Martin | .................. | E06C 7/143 248/210 |
| 5,651,484 A * | 7/1997 | Fugman | .............. | B60R 9/0423 224/310 |
| 5,662,254 A * | 9/1997 | Lemajeur et al. | ..... | B60R 9/0485 248/242 |
| 5,806,905 A * | 9/1998 | Moore | .................... | B60R 9/00 296/3 |
| 5,960,905 A * | 10/1999 | Gardner | ................ | E06C 7/143 248/210 |
| 6,158,798 A * | 12/2000 | Stedtfeld et al. | .... | B62D 33/033 296/10 |
| 6,179,181 B1 * | 1/2001 | Johnson et al. | .......... | B60R 9/10 211/20 |
| 7,210,721 B1 * | 5/2007 | Bell | .................... | B60R 9/0485 224/310 |
| 7,913,885 B2 * | 3/2011 | Long | .................. | B60R 9/0423 224/558 |
| 8,033,362 B1 * | 10/2011 | Cull | ...................... | E06C 7/143 248/210 |
| 8,347,440 B1 * | 1/2013 | Runyan | .................. | B60P 1/435 14/71.1 |

(Continued)

*Primary Examiner* — Nathan J Newhouse
*Assistant Examiner* — Lester L Vanterpool
(74) *Attorney, Agent, or Firm* — Lawrence J. Shurupoff

(57) ABSTRACT

A ladder is safely and securely transported on a work vehicle using a pair of stanchions spaced along one side of the work vehicle. Each stanchion has a lower base portion carried on one side of the work vehicle, and an upper pole portion insertable into a hollow rung of a ladder. In this fashion, a ladder, such as an extension ladder, is supported on only one of its side rails without the need for engagement with tensioned load straps. Because the stanchions and ladder are located on the side of a work vehicle, the ladder takes up no cargo space on the cargo area of the work vehicle.

12 Claims, 8 Drawing Sheets

(56) References Cited

U.S. PATENT DOCUMENTS

| | | | | |
|---|---|---|---|---|
| 8,820,811 | B1* | 9/2014 | Hemphill et al. | B60R 9/00 |
| | | | | 296/3 |
| 8,925,776 | B2* | 1/2015 | Moore | B60R 9/048 |
| | | | | 224/325 |
| 10,501,989 | B1* | 12/2019 | McDonough et al. | E06C 7/143 |
| 2002/0089135 | A1* | 7/2002 | Feik | B62B 5/0083 |
| | | | | 280/63 |
| 2003/0034206 | A1* | 2/2003 | Carroll, Jr. | E06C 7/50 |
| | | | | 182/127 |
| 2004/0163890 | A1* | 8/2004 | Nash, Jr. et al. | E06C 7/16 |
| | | | | 182/122 |
| 2006/0131106 | A1* | 6/2006 | Adams | E06C 7/146 |
| | | | | 182/129 |
| 2007/0221444 | A1* | 9/2007 | Sutton | E06C 5/02 |
| | | | | 182/127 |
| 2008/0079277 | A1* | 4/2008 | Wethington | B60R 9/0485 |
| | | | | 296/3 |
| 2008/0179363 | A1* | 7/2008 | Schmidlkofer | B60R 3/00 |
| | | | | 224/400 |
| 2009/0096236 | A1* | 4/2009 | Hawley | B60R 9/00 |
| | | | | 296/3 |
| 2011/0266402 | A1* | 11/2011 | Parrish | E06C 5/20 |
| | | | | 224/310 |
| 2013/0134194 | A1* | 5/2013 | Moore | B60R 9/048 |
| | | | | 224/309 |
| 2014/0239025 | A1* | 8/2014 | Scott et al. | B60P 3/40 |
| | | | | 224/405 |
| 2020/0255107 | A1* | 8/2020 | Hoffmann | B63C 9/32 |

* cited by examiner

LADDER TRANSPORT SYSTEMS

FIELD OF THE INVENTION

The present invention relates in general to methods and apparatus for supporting and transporting a ladder on a vehicle, and in particular to methods and apparatus for supporting extension ladders on commercial trucks.

BACKGROUND

Commercial work vehicles, such as flatbed trucks with stake pockets running the length of the bed, or stake body trucks, are commonly used to transport tools and materials to job sites. In some cases, it is necessary to carry along relatively large and cumbersome tools and equipment such as extension ladders with closed lengths varying from 6' to 20'. In the roofing trades, extension ladders are transported to job sites for accessing elevated areas such as upper stories and roofs of buildings.

For example, when delivering roofing materials from a warehouse to a job site, it is often necessary to bring along an extension ladder to allow a worker to reach an elevated work site. In some cases, a worker must carry materials and tools from a delivery truck, up the ladder, and onto an elevated portion of a building, such as onto a roof.

The types of ladders typically used for such work are commonly manufactured of aluminum or fiberglass, are of necessity structurally robust in construction and generally relatively expensive. Due to increased load capacity and safety precautions near possible electrical lines, the preferred type of premium ladder used for roofing work and building construction is constructed with fiberglass side rails and tubular metal rungs formed of aluminum.

An example of this type of ladder is an extension ladder having a base section with feet that rest on the ground or other support surface, and a fly section that slides up and down on slide rails formed on the base section. A rope and pulley section is used to lift and lower the fly section along the base section and rung locks are provided to hold the fly section in a desired elevated position on the base section.

When loading and transporting a work ladder on a commercial truck, conventional practice is to lay the ladder flat on its two side rails and secure the ladder in place utilizing ratcheted load straps, made of a nylon webbed material. This approach has been found to cause damage to ladders, as the tensioned load straps can rub and abrade the relatively soft aluminum, fiberglass or plastic sides of the ladder. Continued contact with the abrasive nature of the metal surface of the steel truck bed, along with the often-time accumulation of dirt and debris can eventually degrade the integrity of the fiberglass. Eventually, this wear can render the ladder unfit for safe use. Moreover, excessive tightening of the load straps can crack, fracture and eventually break the fiberglass side rails on the ladder. In the case of aluminum ladders excessive tightening of the load straps can bend, deform and even break the soft aluminum material. These actions eventually can render the extension or slide function of the ladder inoperable and/or unsafe.

Another drawback of the traditional method of carrying a ladder "flat" with both side rails resting on the bed of a work truck is the amount of load space taken up by the ladder. With both sides of a ladder resting on the cargo area of a truck bed, the amount of space remaining available for carrying materials and tools is significantly reduced.

Accordingly, a need exists for a safe and convenient way to secure and transport a ladder on a commercial vehicle. A further need exists for a convenient way for a single worker to manually mount and remove a ladder to and from a commercial vehicle without the need for mechanized equipment.

Yet a further need exists for securing and transporting a ladder on a commercial vehicle without abrading, overstressing or otherwise damaging the ladder with tensioned load straps.

Still a further need exists for a system for carrying a ladder on a commercial vehicle without taking up any cargo space on the truck bed and without obstructing access to the cargo space.

SUMMARY

In accordance with this disclosure, a ladder transport system has been developed to meet the needs noted above. The ladder transport system has been designed primarily for use on stake body trucks, although the system can be easily adapted for use on vehicles without stake bodies and/or without stake pockets. Stake bodies are made available on virtually all types of trucks such as pickup trucks, platform trucks and flatbed trucks. The ladder transport system described below can be used with any of these types of trucks.

Stake body trucks typically have an open cargo area bordered by sockets known as "stake pockets". The stake pockets are evenly spaced apart along opposite sides of the cargo area. Stakes, such as rectangular-sectioned beams and boards, can be inserted within the stake pockets for various purposes such as supporting cargo on the bed of a truck. Both stake body trucks and stake body trailers can quickly and easily be fitted with the ladder transport system as described herein.

The ladder transport system includes a pair of stanchions or uprights for supporting a ladder on a vehicle. Each stanchion has a lower base portion constructed to fit within a stake pocket with a close sliding fit. Each base portion supports an upper pole portion, rod, pipe, bar or similar elongated member constructed to fit closely within a tubular channel formed within the hollow rung of a ladder. The upper pole portions can be aligned with the center of the base portions for proper alignment with the rungs of a ladder.

That is, stake pockets are typically spaced apart by 24 inches (two feet) along the sides of a stake body vehicle. Ladder rungs are typically spaced apart by 12 inches (one foot) along the side rails of an extension ladder. As such, it is relatively easy to align the pole portions on the stanchions with the ladder rungs on the ladder as long as the pole portions are separated by two feet. Centering the pole portions over the base portions of the stanchions ensures such alignment, although other alignments of the pole portions are possible as long as adjacent poles are separated by increments of one or two feet.

It can be appreciated that it is relatively easy for a worker to lift a ladder over the stanchions and align the hollow tubular rungs of the ladder above the pole portions on the stanchions and lower the ladder onto the stanchions so that the pole portions are inserted into, and preferably extend completely through, the ladder rungs. In this manner, a ladder, and particularly an extension ladder, can be quickly and easily supported on only one side rail, with the other side rail located vertically above the supported lower side rail.

As shown in the following drawings and as detailed below, significant advantages can be realized by adopting this vertical orientation of a ladder with one side rail positioned vertically over the other side rail and extending along the side of a vehicle. For instance, by supporting a ladder a described herein, only metal-to-metal contact results between the exposed ends of the ladder rungs and the support surfaces on the stanchions. This avoids rubbing contact between the softer fiberglass side rails on the ladder and the harder metal stanchions and thereby protects the ladder from excessive stress and wear.

Moreover, as the ladder is supported adjacent to the external rub rails on a truck, the ladder takes up virtually no cargo space and allows for the unobstructed transportation of cargo. A clearance space is provided between the truck bed and the ladder to allow for the free passage of load strap's metal hook below the ladder and so as to avoid any contact, rubbing or wear on the ladder from tensioned load straps.

As used herein, the term upper means higher in elevation in an intended installed position and the term lower means lower in elevation in an intended installed position. The term extending upwardly means extending at an upward angle to the horizon when positioned in an intended installed position on a horizontal surface and the term substantially vertically means extending substantially perpendicularly to the horizon when positioned in an installed position on a horizontal surface.

Various other objects, features and attendant advantages of the present invention will be more fully appreciated as the same becomes better understood from the following detailed description.

BRIEF DESCRIPTION OF THE DRAWINGS

In the drawings.

In the various views of the drawings, like reference numbers designate like or similar parts.

DESCRIPTION OF REPRESENTATIVE EMBODIMENTS

Figure 1:
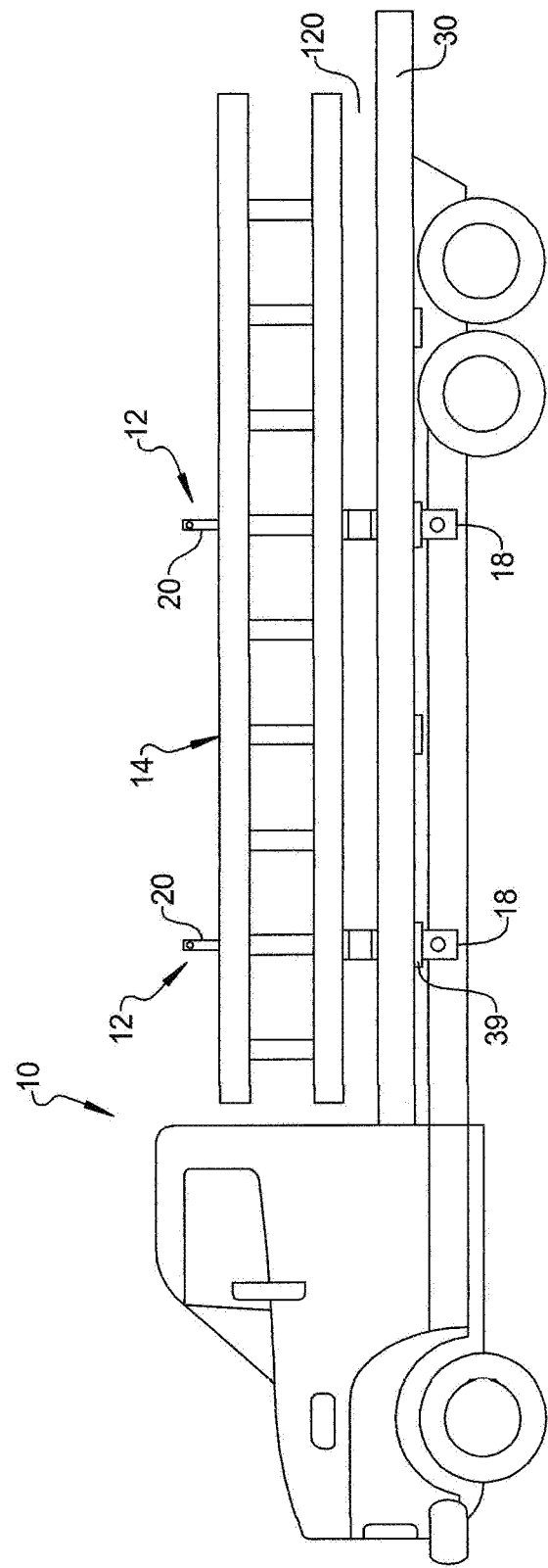
FIG. 1 is a schematic side view of a representative truck fitted with a pair of stanchions which supports a ladder in accordance with this disclosure.

As seen in FIG. 1, a work vehicle 10 is depicted as a flatbed stake body truck, although any type of stake body truck or other type of truck can be fitted with the ladder transport system as described herein. The work vehicle 10 is provided with a pair of ladder stanchions 12 for supporting and transporting a ladder 14 in accordance with this disclosure.

Each stanchion 12 includes a lower base portion 18 and an upper pole portion 20. The upper pole portion 20 can consist of a single pole extending upwardly in elevation from the base portion 18.

As described below, the base portion 18 is constructed and dimensioned to fit within a stake pocket on a stake body truck and the pole portion 20 is constructed and dimensioned to fit within a hollow rung of a ladder carried on the stake body truck. The pole portion 20 can be formed of a solid metal rod or a hollow metal pipe.

Figure 2:
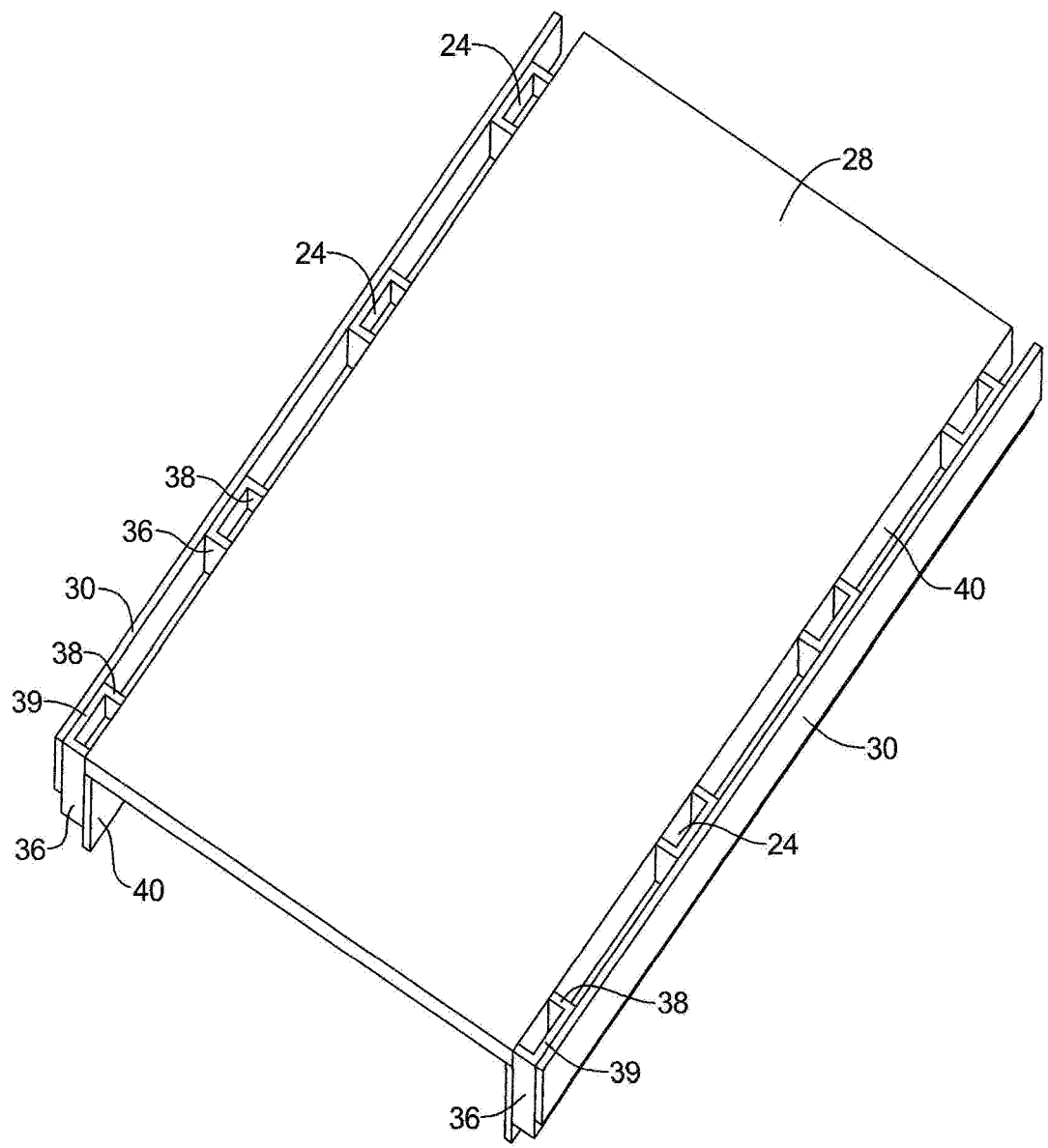
FIG. 2 is a top perspective view of a truck bed of the type provided on the truck shown in FIG. 1 and showing the location of stake pockets spaced along the opposite sides of the truck bed.

The cargo platform or bed of a stake body truck, such as the work vehicle 10, is constructed as shown in FIG. 2. A series of evenly spaced apart stake pockets 24 is provided along opposite sides of a vehicle cargo platform or truck bed 28.

Figure 3:
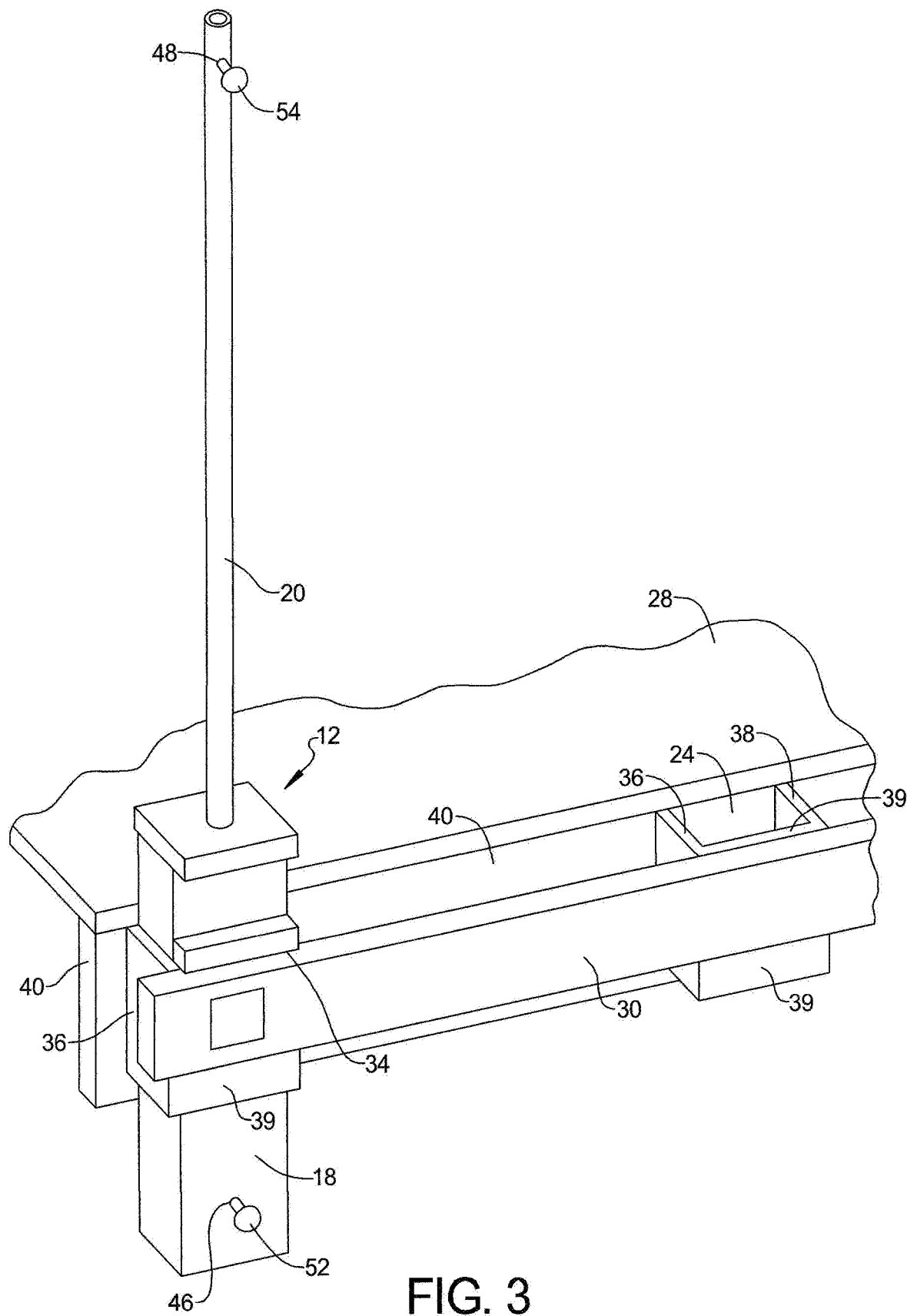
FIG. 3 is a perspective view of a portion of the truck bed of FIG. 2, showing a stanchion mounted within a stake pocket.

As seen in FIG. 3, each lower base portion 18 of a stanchion 12 serves as a stake portion closely fitted within a stake pocket 24. In this example, the stake pockets 24 are constructed in the form of rectangular-sectioned hollow sleeves. Each stake pocket 24 is constructed for receiving a complementary-shaped and sized rectangular base portion 18 of a stanchion 12 with a close or snug sliding fit.

The stake pockets 24 are bordered by an external rub rail 30, typically formed of an elongated iron or steel plank. In this example, the stake pockets 24 are located between the truck bed 28 and the outer rub rail 30.

The vertical height of each stanchion 12, when inserted into a stake pocket 24, is set and determined by the location of an engagement member such as a support bar 34. The support bar 34 serves as a stop member to set and limit the vertical height of the stanchion when installed on a work vehicle 10. The support bar 34 projects laterally or horizontally from a side surface portion of the lower base portion 18 to properly and consistently position the stanchion 12 on the work vehicle 10.

As the base portion 18 is inserted and lowered into a stake pocket 24, the support bar 34 abuts and seats upon, for example, a top surface portion of a stake pocket 24 and/or a top surface portion of a rub rail 30, as further shown in FIG. 3. An engagement member, stop member or support bar 34 can be located on any one or more sides of the base portion 18 to seat and rest upon a surface portion of the work vehicle 10 on or around a stake pocket 24. The engagement member can seat on a front plate 36 of a stake pocket 24, a rear plate 38 of a stake pocket 24, a side plate 39 of a stake pocket 24 and/or an edge portion of the truck bed 28.

The stanchion 12 is easily mounted on the work vehicle 10 by inserting and lowering the base portion 18 into a stake pocket 24 with a simple downward sliding movement until an engagement member, such as the projecting ledge formed by support bar 34, abuts and engages a portion of the work vehicle 10 as noted above.

Figure 4:
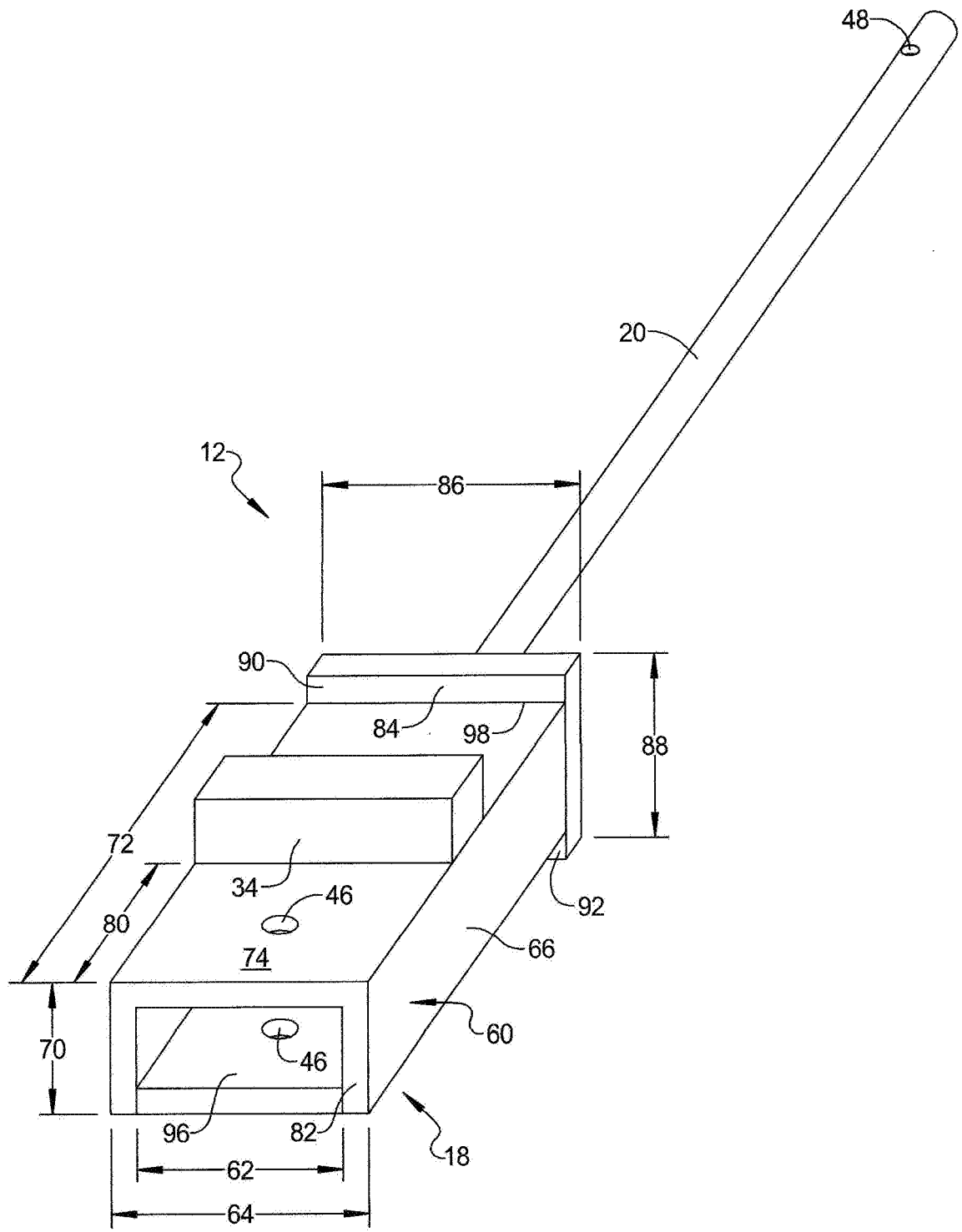
FIG. 4 a bottom front side perspective view of the stanchion of FIG. 3.
Figure 5:
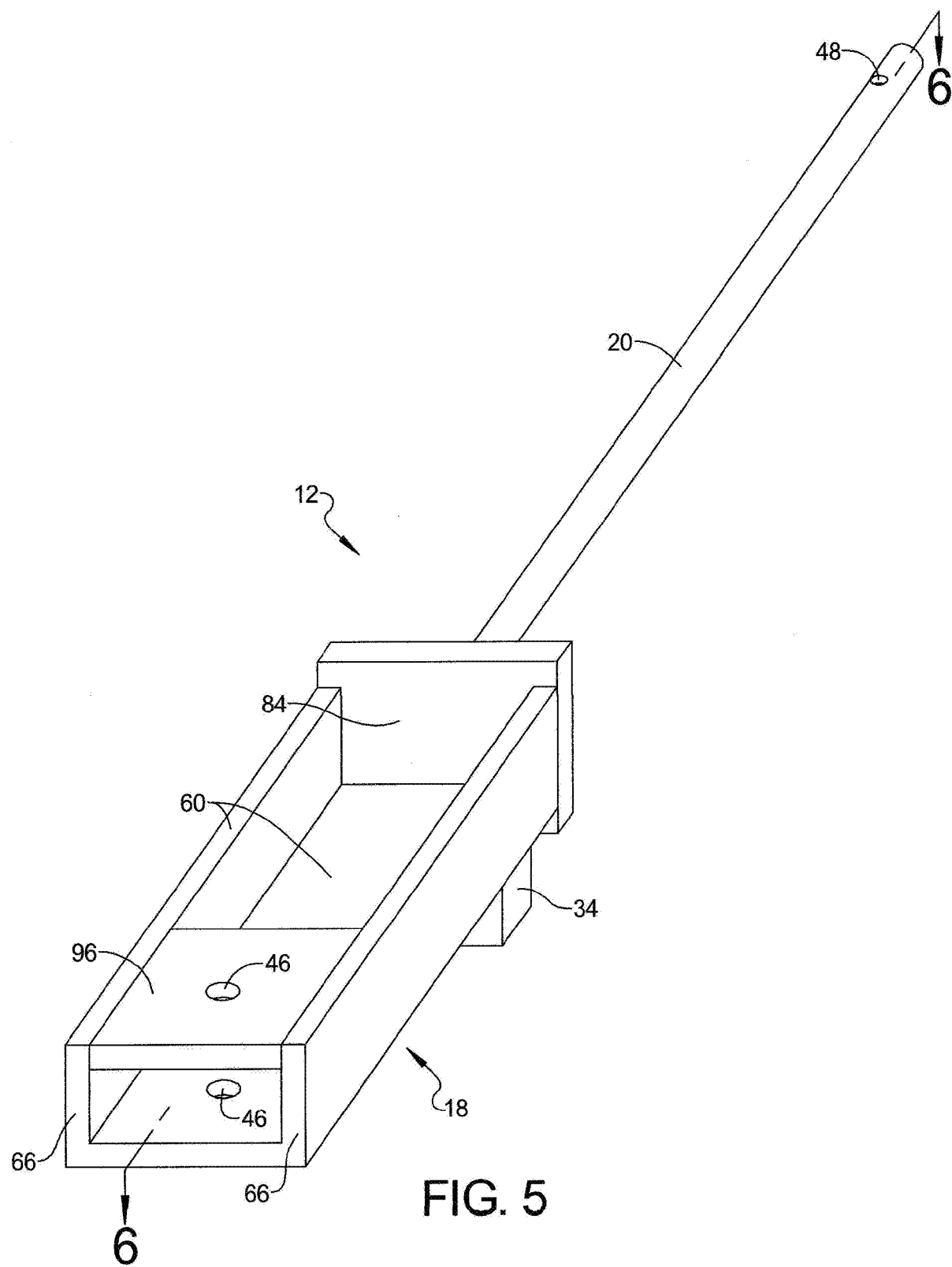
FIG. 5 is a bottom rear side perspective view of the stanchion of FIG. 3.

As seen in FIG. 4, a pair of openings 46 is formed through the base portion 18 of the stanchion 12 and a pair of openings (if the pole portion is tubular) or a through hole 48 (if the pole portion is solid) is formed through the top portion of the pole portion 20 of the stanchion 12.

Returning to FIG. 3, a removable bottom lock pin 52 is shown inserted through the openings 46 to prevent the stanchion 12 from upward release from a stake pocket 24 and a removable top lock pin 54 is inserted through the openings or through hole 48 on the pole portion 20 to prevent upward release of a ladder 14 supported by the stanchion 12.

The bottom lock pin 52 extends through and beyond the base portion 18. Upon upward movement of the base portion 18, the bottom lock pin 52 can abut the bottom of the rub rail 30 or the bottom of the stake pocket 24 to prevent further upward movement of the stanchion 12. In a similar fashion, the top lock pin 54 extends across and beyond the width of a ladder rung (FIG. 7) to prevent the ladder from moving upwardly and off of the pole portion 20. As further shown in FIG. 7, the top lock pin 54 can be secured to the ladder 14 with a cable or chain 56 to prevent loss of the lock pin 54. The bottom lock pin 52 can be secured to the base portion 18 of the stanchion 12 in a similar manner.

In the example of FIG. 4, the base portion 18 of the stanchion 12 can be fabricated from a quarter inch thick three-sided channel iron 60. The channel iron 60 can have an inner width 62 of two and one-half inches and an outer width 64 of three inches. The channel iron outer sidewalls 66 can have a depth 70 of one and one-half inches and a length 72 of ten inches. This sizing and dimensioning will complement the rectangular opening of most commercially available stake pockets with a close secure sliding fit. Of course, any other dimensioning of the base portion 18 is possible for matching the dimensions of virtually any size or shape of stake pocket 24.

The engagement member or support bar 34 can be formed from a one-inch square bar of steel keystock. The support bar 34 can be welded or otherwise fixed to the outer side surface 74 of the base portion 18 at a distance 80 of six and three-quarter inches from the bottom surface 82 of the channel iron 60. As noted above, the engagement member or support bar 34 can be provided on any one or more sides of the channel iron 60. The flanges 90 and 92 form corners or troughs 98 for forming welds 100 (FIG. 6) within the troughs 98.

A support plate 84 is welded or otherwise secured to the top of the channel iron 60. The support plate 84 can be dimensioned as a quarter inch thick iron or steel flat-bar. In the example of FIG. 4, the support plate 84 has a width 86 of three inches and a depth 88 of two inches. With this dimensioning, a front flange 90 and a rear flange 92 are formed by centering the support plate 84 over the top of the channel member 60. The flanges 90 and 92 form troughs 98 to facilitate formation of welds 100 (FIG. 6) along the troughs 98.

As shown in FIG. 4, a one-quarter inch thick iron flat-bar 96 two and one-half inches wide and three inches high is welded or otherwise fixed between the side walls 66 of the channel iron 60. The flat-bar 96 provides support and rigidity for the lower lock pin 52 (FIG. 3). Opening 46 is centered in the middle of the flat-bar 96 and can be dimensioned to snugly receive a standard size lock pin 52.

The upper pole portion 20 can take the form of a solid iron rod one-half inch in diameter and twenty inches long. Alternatively, the upper pole portion 20 can take the form of a one-half inch diameter schedule 40 iron pipe.

In either case, the upper pole portion 20 is welded or otherwise fixed to the top of the support plate 84. In the example shown, such as in FIG. 6, the upper pole portion 20 is centered on the support plate 84. The through hole or upper opening 48 can be centered one inch from the free end of the pole portion 20 with a diameter dimensioned to snugly receive a standard size top lock pin 54.

Figure 6:
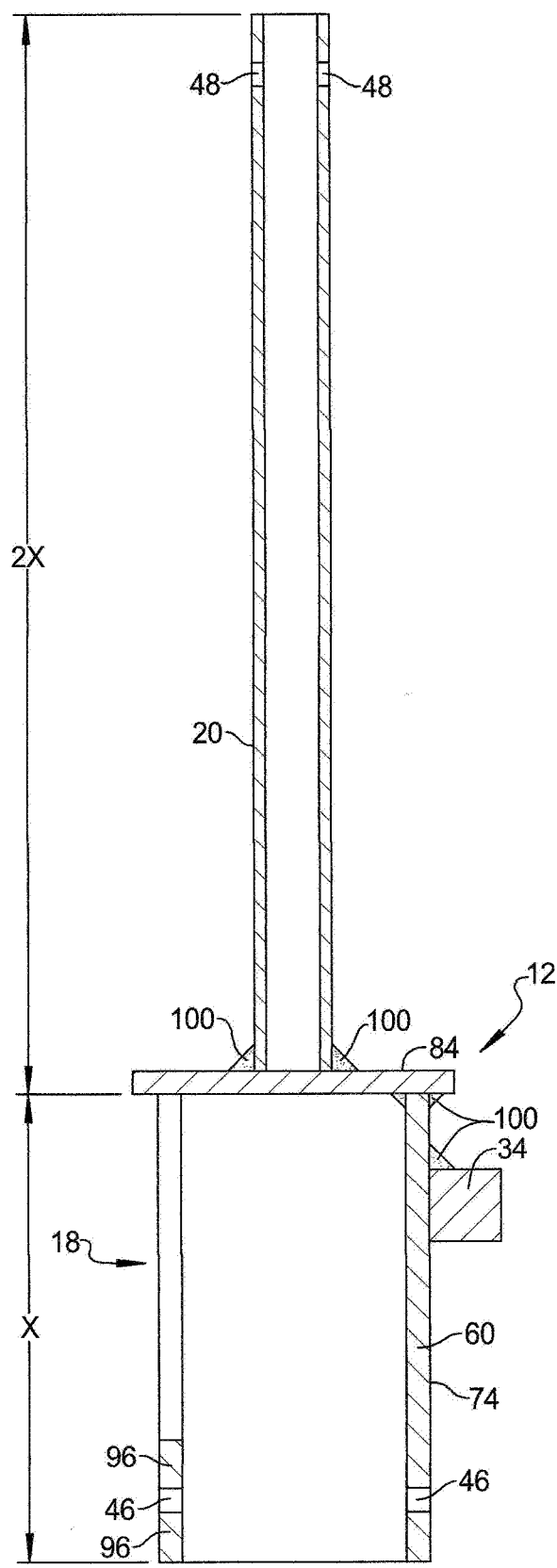
FIG. 6 is a view in section taken along section line 6-6 of FIG. 5.

Additional details of the stanchion 12 are shown in FIG. 6. Welds 100 are shown holding the pole portion 20 on the support plate 84, and holding the engagement member or support bar 34 on the front surface 74 of the channel iron 60. While the pole portion 20 is shown extending perpendicularly at ninety degrees from the plane of the top surface of the support plate 84, the pole portion 20 can extend at any other suitable angle for engaging and entering the rungs of a ladder to position and restrain the ladder 14 on the work vehicle 10. In this example, the height "X" of the base portion 18 can be about half the height "2X" of the pole portion 20 plus or minus 50%.

Figure 7:
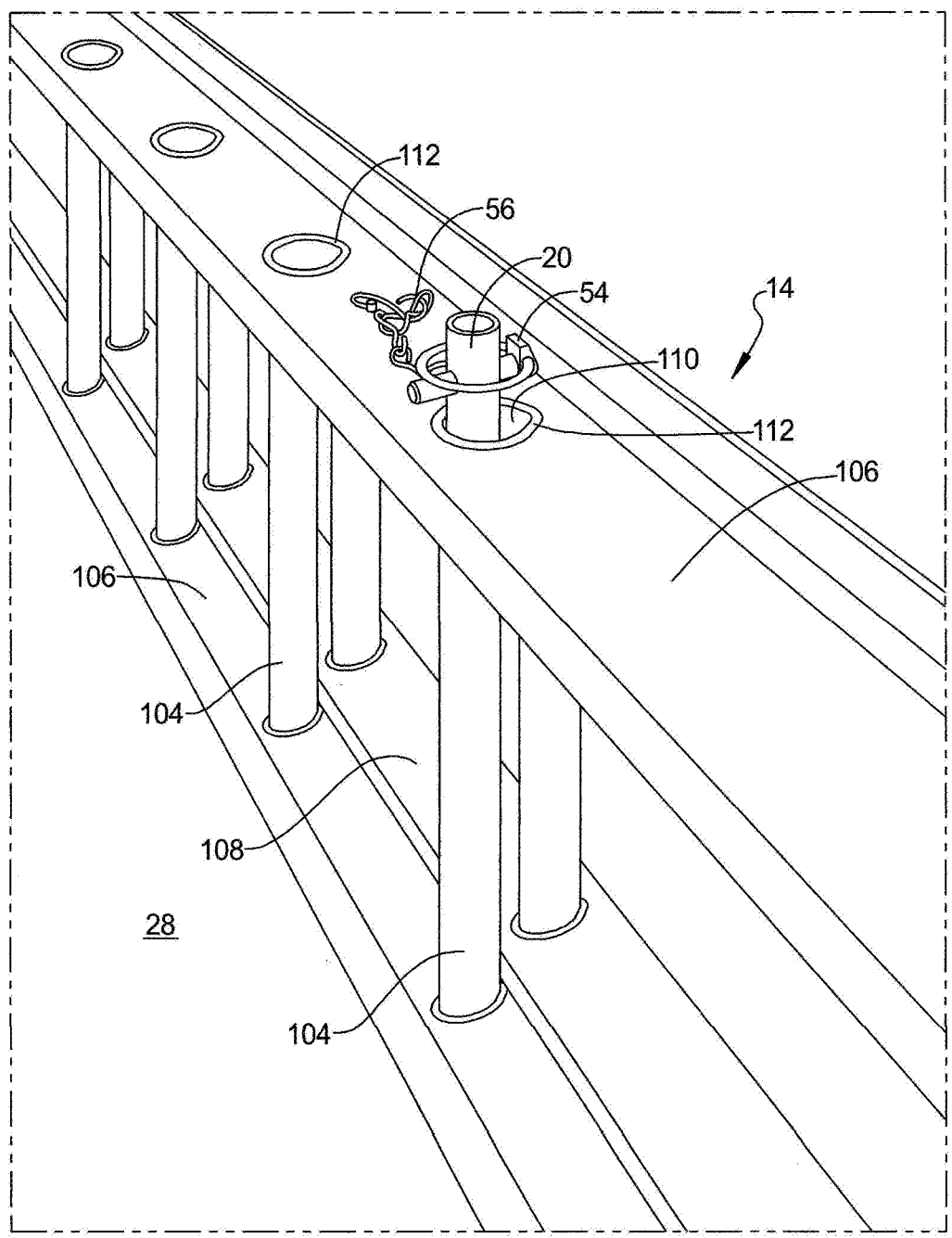
FIG. 7 is a perspective view of a portion of an extension ladder mounted on a portion of a stake body truck such as shown in FIG. 1.

FIG. 7 shows a portion of the ladder 14 of FIG. 1 secured adjacent to the side of the truck bed 28. A top portion of the pole portion 20 is seen extending through and projecting above a ladder rung 104 on the base section of 106 of an extension ladder 14. The upper lock pin 54 is shown inserted through the pole portion 20 to prevent the ladder 14 from upward release from the pole portion 20 during transportation.

In the example of FIG. 7, the base section 106 of the extension ladder 14 is spaced apart from the cargo area of the truck bed 28 and aligned over and adjacent to the side beam 40 of the truck bed 28. The fly section 108 of the extension ladder 14 is positioned remote from the truck bed 28 and over the rub rail 30. This positioning of the ladder 14 takes up no space on the cargo area of the truck bed 28.

As further seen in FIG. 7, each ladder rung 104 is fixed on the ladder 14 with a pair of rolled-over or crimped annular end portions 110 formed or otherwise fixed on each side rail. These crimped end portions 110 of the ladder rungs form external collars or flanges 112 pressed against the exterior surface portions of the respective base and fly sections 106, 108 of the ladder 14.

When a ladder 14, such as the ladder 14 in FIG. 7, is lowered onto a stanchion 12, the collars or flanges 112 will rest upon the top of the support plate 84. This results in metal-to-metal contact between the collars 112 and the stanchions 12 and prevents or limits contact between the softer side-rails of the base section 106 of the ladder 14 and the top support surface of the metal support plate 84.

The collars or flanges 112 on the ladder 14 act as spacers between the softer plastic, fiberglass or aluminum side rails of the ladder 14 and the harder metal support plates 84. This spacing is shown in FIG. 8 as a vertical clearance 116.

Figure 8:
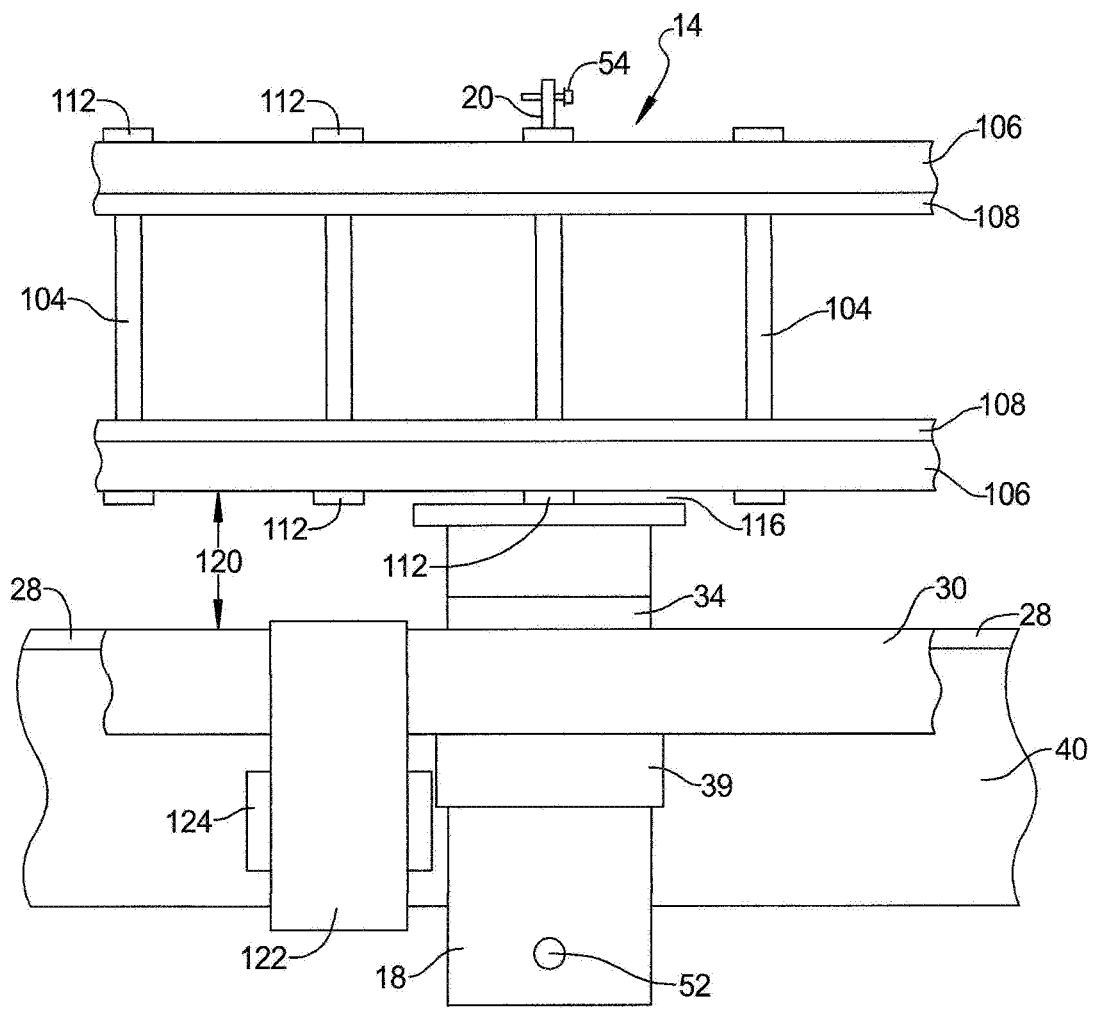
FIG. 8 is a side elevation view of FIG. 7.

As further seen in FIG. 8, another vertical clearance space 120 is provided between the ladder 14 and the rub rail 30. Clearance space 120 allows for the passage of load straps 122 beneath the ladder 14 and without contact between the load straps and the ladder 14. This clearance prevents the load straps from applying any load or pressure on the ladder. In FIG. 8, a load strap 122, which extends across the truck bed 28 is shown scrolled on a ratchet spool 124.

Only the weight of the ladder is applied to the collars 112. The distance between the bottom of the support bar 34 and the top of the support plate 84, plus a small additional spacing 116 equal to the height of a collar 112 determines the vertical extent of clearance 120.

FIG. 8 further discloses a side beam 40 that extends logitudinally below and supports the truck bed 28. The external side of the side beam 40 can abut and laterally support the bottom portion 18 of the stanchion 12. In those cases where a truck 14 is not provided with stake pockets 24, the side beam 40 can provide an anchor for a pair of stanchions 12.

Figure 9:
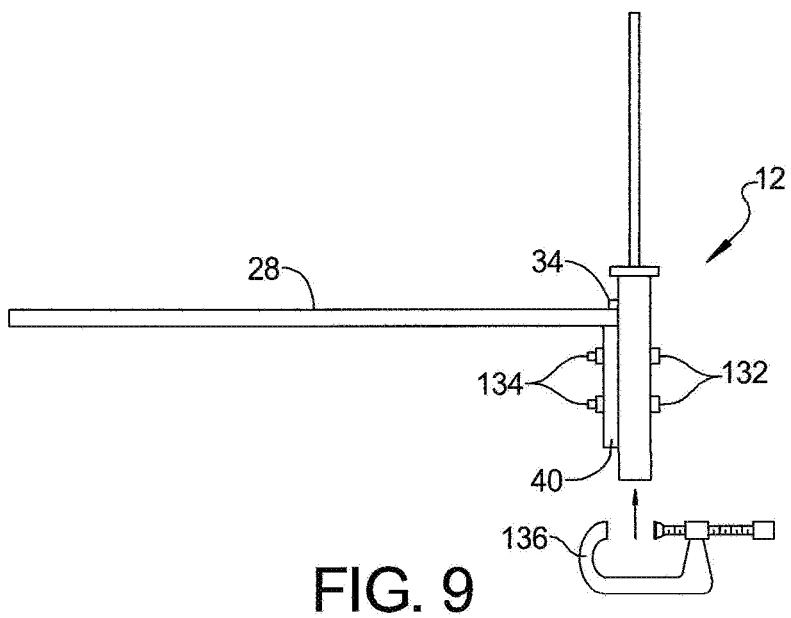
FIG. 9 is a partial view of a stanchion secured to a work vehicle frame with mechanical fasteners or clamps.

As shown in FIG. 9, the lower base portion 18 of the stanchion 12 can be formed with two sets of openings 46 (FIG. 4) aligned with two openings drilled or bored through the side beam 40. Bolts 132 and nuts 134 or other fasteners can be used to secure the stanchions 12 directly to the frame of a work vehicle 10. In this case, the support bar 34 can be used as a reference for proper placement of the stanchion on the work vehicle.

Alternatively, one or more clamps, such as C-clamp 136, can be used to secure the lower base portion 18 to the frame member or side beam 40, or to any other suitable location on the work vehicle 10, such as to the rub rail 30.

Other variations are within the spirit of the present invention. Thus, while the invention is susceptible to various modifications and alternative constructions, certain embodiments thereof have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

For example, the base portion 18 of the stanchion 12 need not be formed with a U-shaped channel iron 60. A four sided metal tube or only two opposed front and rear plates could be used in place of the channel iron construction described above. Moreover, the base portion 18 can be formed with a single bottom plate extending diagonally across a stake pocket, with a support bar 34 fixed to one or both sides of the bottom plate.

What is claimed is:

1. A ladder transport system, comprising:
a ladder comprising a first side rail and a second side rail;
a first hollow ladder rung and a second hollow ladder rung each extending between said first and second side rails;
a vehicle comprising a cargo bed;
a first stanchion mounted on said vehicle and a second stanchion mounted on said vehicle, each of said first and second stanchions comprising a base portion having an upper base portion and a lower base portion, a stop member fixed to and projecting laterally between said upper and lower base portions, and a support surface provided on said upper base portion and spaced above said stop member to define a vertical clearance between said support surface and said stop member;
said first stanchion comprising a first pole portion extending upwardly into said first hollow ladder rung on said first side rail and said second stanchion comprising a second pole portion extending upwardly into said second hollow ladder rung on said first side rail; and
wherein said ladder is supported, restrained and positioned on said vehicle by said first and second stanchions and elevated adjacent to and above said cargo bed by engagement between said stop member and said vehicle and wherein said first and second pole portions are respectively fixed in a vertical position on each said base portion and respectively extend through and beyond said first and second hollow ladder rungs.

2. The system of claim 1, wherein said vehicle comprises a first stake pocket and a second stake pocket, and wherein said first stanchion is carried in said first stake pocket and said second stanchion is carried in said second stake pocket.

3. The system of claim 1, further comprising a pair of flanges provided on opposite end portions of said first and second hollow ladder rungs and wherein only the weight of said ladder is supported on said first and second stanchions by a first flange on said first hollow ladder rung and a second flange on said second hollow ladder rung.

4. The system of claim 3, wherein said first flange on said first hollow ladder rung and said second flange on said second hollow ladder rung respectively seat on said support surface on each of said first and second stanchions and limit contact between said first side rail and said support surface on each of said first and second stanchions.

5. The system of claim 1, wherein said vehicle comprises a rub rail and wherein said ladder is disposed adjacent to and above said rub rail.

6. The system of claim 1, wherein said ladder comprises an extension ladder having a base section and a fly section, and wherein only said base section engages said first and second stanchions.

7. The system of claim 1, further comprising first and second lock pins respectively extending through said first and second pole portions above said first and second hollow ladder rungs.

8. A ladder stanchion, comprising:
a base portion comprising a plurality of sidewalls constructed and dimensioned for insertion into a rectangular stake pocket, and an upper top base portion and a lower bottom base portion;
a stop member fixed to and projecting laterally from one of said plurality of sidewalls at a position spaced below said upper top base portion and spaced above said lower bottom base portion to determine a vertical height of said stanchion when installed on a vehicle;
a ladder support surface provided on said upper top base portion and spaced above said stop member to provide a vertical clearance space between said upper support surface and said stop member for passage of a load strap; and
a pole portion extending upwardly from said ladder support surface and constructed and dimensioned for insertion into a tubular ladder rung and wherein said pole portion is centered on said ladder support surface and extends vertically upwardly from said ladder support surface.

9. The ladder stanchion of claim 8, wherein said base portion comprises a rectangular base portion defined by said plurality of sidewalls.

10. The ladder stanchion of claim 8, wherein said ladder support surface comprises an iron or steel flat-bar welded to one of said plurality of sidewalls.

11. The ladder stanchion of claim 8, wherein said ladder support surface comprises a flat support plate.

12. The ladder stanchion of claim 8, wherein said base portion comprises a three-sided channel iron.

* * * * *